UNITED STATES PATENT OFFICE.

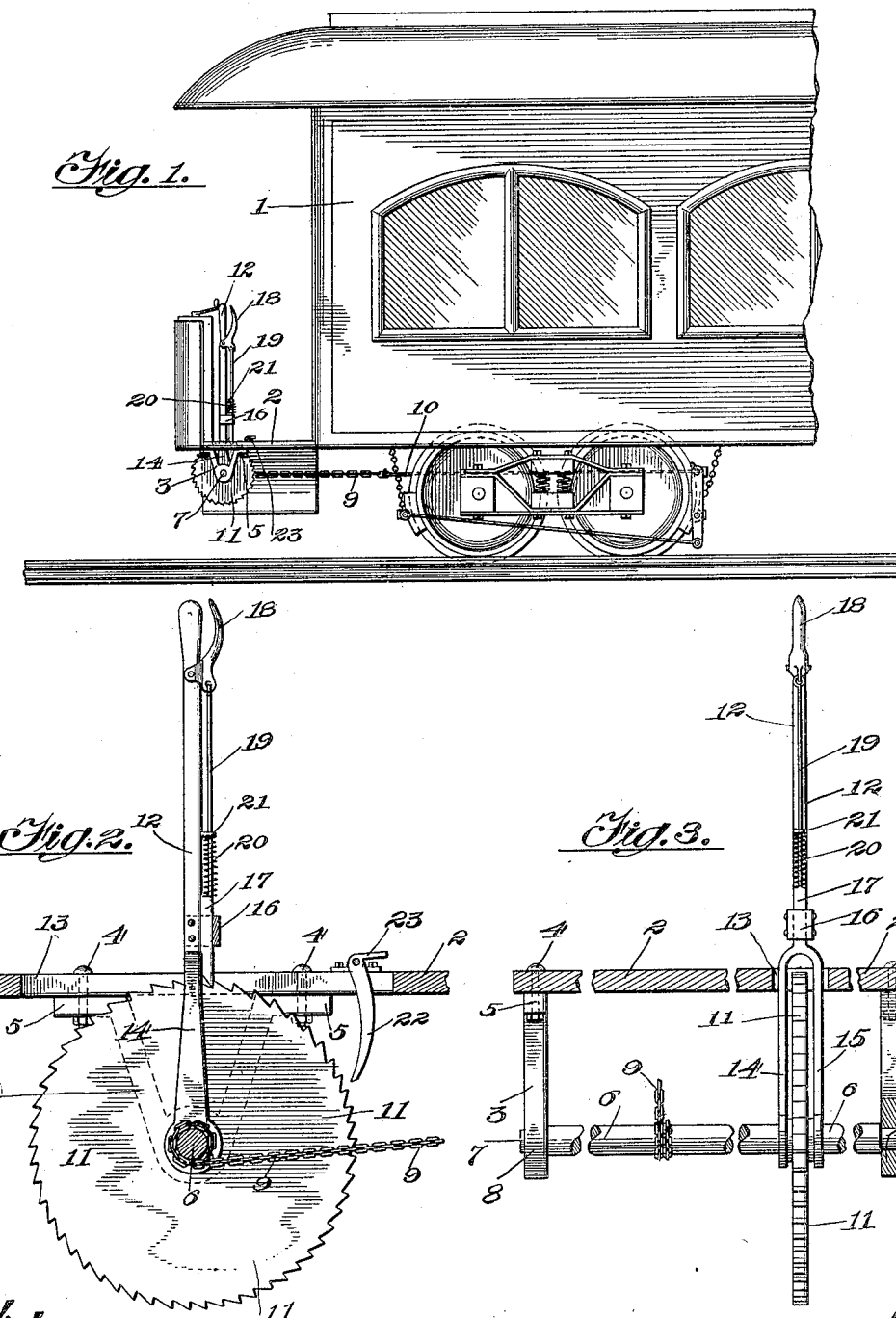

OWEN M. JONES, OF CHICAGO, ILLINOIS.

CAR-BRAKE.

No. 822,522.

Specification of Letters Patent.

Patented June 5, 1906.

Application filed October 19, 1903. Serial No. 177,632.

*To all whom it may concern:*

Be it known that I, OWEN M. JONES, a citizen of the United States, residing at Chicago, in the county of Cook and State of Illinois, have invented a certain new and useful Improvement in Car-Brakes, of which the following is a full, clear, concise, and exact description, reference being had to the accompanying drawings, forming a part of this specification.

My invention relates to certain improvements in operating appliances for car-brakes, and more particularly to appliances for operating the brakes of motor and grip cars.

It has for its object to provide means for quickly applying the brakes to the car-wheels with a minimum expenditure of effort upon the part of the operator.

A further object of my invention is to provide a brake-operating means which shall be simple in construction, cheap of manufacture, and effective in use.

The brake-operating mechanism now most generally in use comprises a vertical shaft or drum, upon the lower end of which the brake-chain is wound, and a crank-arm secured upon the upper end of said shaft and rotating in a horizontal plane. It has been found that this construction is slow in its operation, as each turn given to the shaft necessitates the movement of the crank-arm in a complete circle. By this arrangement also small leverage only is obtained, the leverage being measured by the length of the crank-arm, which must necessarily be made short enough to be rotated by an operator standing on the front platform of the car. I have found that by mounting a rotating drum in a horizontal position beneath the car-platform and operating said drum by a lever extending up through the car-platform the brakes may be more quickly set and a greater leverage obtained for applying the brakes.

I have illustrated the preferred embodiment of my invention in the accompanying drawings, forming a part of this application, in which—

Figure 1 is a side elevation of the end of a car, showing the operating appliance in position upon the car-platform. Fig. 2 is a side elevation of the operating appliance, and Fig. 3 is a front view thereof.

Like numerals refer to like parts in the several figures.

In the preferred construction of my invention I mount upon the under side of the platform 2 of the car 1 depending brackets 3 3, which are secured in place by bolts 4 passing through holes in the lugs 5 of the brackets and through the platform. A drum 6 is mounted between the brackets and has suitable journals 7, journaled in bearings 8, formed in said brackets. One end of a chain 9 is secured to the drum 6, said chain being adapted to be wound thereon when the drum is caused to rotate. The chain at its opposite end is secured to the rod 10, which is connected with the car-brake beam.

For the purpose of rotating the roller 6 a ratchet-wheel 11, having its teeth formed with one side thereof vertical, is mounted upon said roller and is operated by a lever 12, which extends upwardly through a slot 13 in the platform. The lower end of the lever is bifurcated and forms arms 14 and 15, which are loosely secured to the drum 6 upon either side of the wheel. Mounted upon the lever 12 and secured in position by a strap 16, bolted on each side of the lever, is a dog 17, the lower end of which engages the teeth of the ratchet-wheel 11 and moves the same around as the lever is oscillated. A supplemental handle 18 is pivoted to the lever 12, at the upper end thereof, and by means of a rod 19 is connected with the dog. By pressing upon the handle 18 the dog is released from engagement with the ratchet-wheel and the chain 9 allowed to unwind and release the brakes. For normally holding the dog 15 into engagement with the ratchet-wheel a coiled spring 20 is mounted upon the rod 19, having its lower end bearing against the dog 17 and its upper end against a lug 21, which lug also serves as a guide for the rod 19. A cam 22 is pivotally mounted upon the platform 2 and extends downwardly through the slot 13 to engage the teeth of the ratchet-wheel 11 to hold the same against movement when the lever is moved forward to cause the dog to engage the teeth of the wheel. This cam 22 normally hangs out of engagement with the ratchet-wheel and is thrown into operative relation with the wheel by the pressure of the foot upon a foot-piece 23, formed integral with the cam and projecting above the platform.

It will be seen that by mounting the drum in a horizontal position beneath the car and rotating the same through the medium of a ratchet-wheel operated by an oscillating lever pivoted beneath the platform and extending vertically through the platform of the car to a position convenient to the operator the brakes may be quickly applied, as the lever may be readily moved back and forth by the operator, and that a greatly-increased leverage may be obtained.

Having thus described my invention, what I claim as new, and desire to secure by Letters Patent, is—

In a car-brake, the combination with a brake-beam, of a roller journaled beneath the car-platform and suitably connected with said beam, a ratchet-wheel mounted upon said roller and having one side of the teeth thereof formed radially, an oscillating lever fulcrumed upon said roller, a dog slidably mounted upon said lever and having a substantially straight side adapted to engage the radially-formed side of the teeth of the ratchet-wheel, and a foot-operated dog normally out of engagement with said ratchet-wheel to hold the same when the wheel is released by said lever.

In witness whereof I have hereunto subscribed my name in the presence of two witnesses.

OWEN M. JONES.

Witnesses:
M. R. ROCHFORD,
W. CLYDE JONES.